Oct. 29, 1940.     C. E. BENNETT     2,219,289
JOINT FOR NONMETALLIC PIPES
Filed Aug. 22, 1939
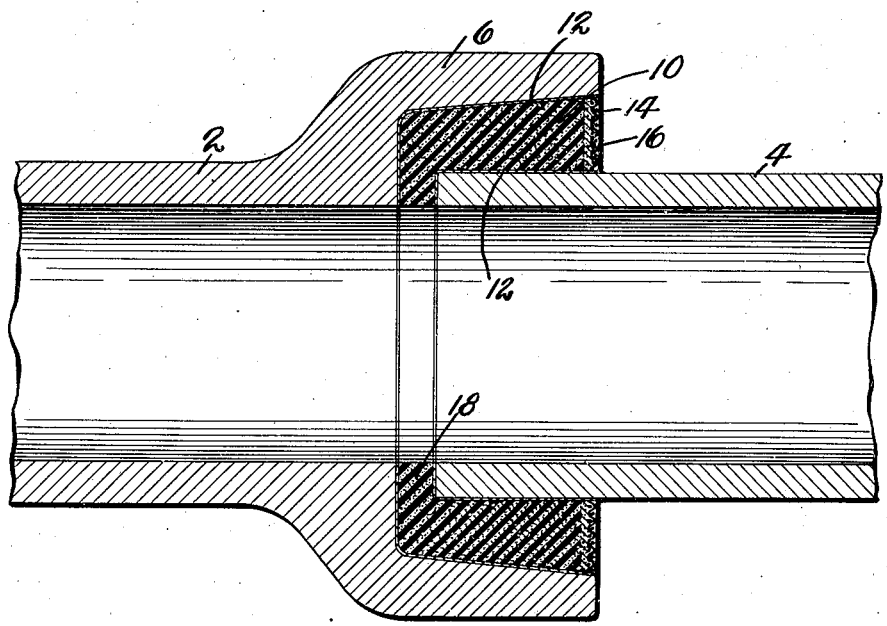
INVENTOR
Charles E. Bennett,
BY
Kiddle, Bethell and Montgomery.
ATTORNEYS.

Patented Oct. 29, 1940

2,219,289

UNITED STATES PATENT OFFICE 2,219,289

JOINT FOR NONMETALLIC PIPES

Charles E. Bennett, Ridgewood, N. J.

Application August 22, 1939, Serial No. 291,291

2 Claims. (Cl. 285—90)

This invention is directed to an improved joint for non-metallic pipes, such as clay tile sewer pipes, water pipes, etc., of the type comprising a plain faced cylindrical spigot and a cooperating bell or cylindrical flange.

One object of my invention is to provide a fluid seal floating joint for pipes of the type mentioned, that is to say, a joint in which the jointed pipe lengths may be moved relatively angularly as well as circumferentially without breaking the seal of the joint.

A further object of my invention is the provision of a fluid-seal joint for the purpose indicated which will automatically compensate for variations in the diameters of the pipe lengths being jointed, so that no more accuracy is necessary so far as this feature is concerned than is exercised today.

A still further object of the invention is the provision of a fluid seal joint construction which is adapted for use with spigot and bell constructions even though the spigot and/or bell, due to manufacturing conditions, may be elliptical or other out-of-round shape.

Another object of my invention is the provision of a fluid-seal floating joint construction which is of such a nature that excessive strains will not be imposed upon the pipe lengths so as to crack the same as, for example, in assembling, handling, back filling, vibrations due to traffic conditions and settling after the line has been installed.

A further object of the invention is the provision of a fluid seal floating joint construction wherein the danger of tree roots passing through the joint to clog the line is eliminated.

These as well as other objects and desirable features which make for a construction superior to the joints heretofore used will be referred to hereinafter.

In the accompanying drawing I have illustrated one embodiment of my invention in sectional elevation.

Referring to the drawing in detail: 2 and 4 designate two lengths of tile pipe which are to be united by my improved floating joint.

The length 2 is provided at its end with a bell 6, while the adjacent end of the length 4 is a plain faced cylindrical spigot 8. The bell 6 may be a straight sided cylinder, if desired, but preferably is frusto conical, tapered outwardly, as illustrated, to provide a tapered space between the spigot and bell when the spigot is assembled with the bell.

Interposed between the bell 6 and spigot 8 is a compressible and extensible gasket 10. This gasket is shown as composed of a cellular rubber, such as sponge rubber. It is to be understood that material other than sponge rubber can be employed for the gasket. The desideratum is a material which internally is provided with spaces in the form of pockets or in the form of internal passages so that the gasket will be compressible and extensible in all directions. For clarity and brevity I will employ the term "cellular rubber-like material" to cover all of the forms mentioned.

The gasket 10 may be molded, or it may be made in a strip, the length of which is equal to the circumference of the spigot, the two ends of the gasket being cemented together. In any event, the gasket will have the usual facing skin for preventing the entry of fluids into the interior of the gasket.

The gasket is bonded to both the bell and spigot by a suitable cementing material or where practicable the bond may be effected by vulcanizing. The bond is designated 12.

The outer end of the gasket may be provided with fine mesh copper cloth, as shown at 14, which, when the gasket is molded, may be applied in the molding operation. This is an additional protection against tree roots working into the gasket. I suggest, also, facing the outer end of the gasket with a bituminous coating 16 which will protect the gasket against the action of any deleterious material in the earth in which the joint is buried.

In assembling the joint the gasket 10 with the bonding material applied thereto may be placed in the bell 6 or upon the spigot 8 and then the spigot and bell forced into each other by any suitable tool which will impose a longitudinal thrust on the pipe lengths.

The gasket 10, it is to be understood, will always be of such dimensions that when the joint is assembled the gasket will be under compression at all times. This will take care of variations in bell and spigot sizes as well as variations in shapes.

As above pointed out, in the clay tile pipe industry it is customary to work to large tolerances and as also pointed out it is not always possible to avoid having the bell or the spigot go to an out-of-round shape in the curing process. This is not of any consequence with my invention, the gasket 10 being compressible and extensible automatically compensating for these irregularities or non-uniform constructions.

It will be further appreciated that inasmuch as the gasket 10 is bonded to the bell and spigot the joint will be liquid-tight, and that inasmuch as the gasket is compressible and extensible in all directions the pipe lengths 2 and 4 can be moved relatively angularly as well as circumferentially without destroying the seal of the joint. When the joint is bent, that is, when the pipe lengths are moved relatively angularly to move the bell away from the spigot at one side of the joint, the material of the gasket, by reason of the bond 12, will be extended or drawn out to maintain this space sealed, the gasket at the other side of the joint being compressed. It will be appreciated also that inasmuch as the spigot and bell are both bonded to the gasket and by reason of the compressibility and extensibility of the gasket the pipe lengths may be rotated relatively without breaking the seal. In other words, the joint, properly speaking, is floating so that the bell and spigot may be moved angularly as well as circumferentially relatively to each other while maintaining the fluid seal.

I am well aware that many attempts have been made prior to my invention to make a joint which will be fluid-tight under all conditions of use. For example, the use of a plastic between the spigot and bell has been suggested. Such a material, however, is not compressible and if the bell and spigot are moved relatively to vary the angle between them it is quite obvious that the plastic will squeeze out at the narrowed side of the joint and not fill up the widened side. It will be quite apparent, also, that if an ordinary rubber gasket be employed between the spigot and bell the rubber being incompressible the joint will be rigid and any load placed on the joint in a direction to move the pipe lengths angularly will crack the bell.

With the joint of the present invention, due to the fact that the gasket is of cellular rubber-like material and due to the fact that the gasket is bonded to both the bell and spigot, the gasket will always follow the movement of the bell and spigot and always maintain a fluid seal between them.

In the form illustrated the forward end of the gasket 10 is provided with an inwardly extending flange 18 which is engaged by the inner end of the spigot 8. While this flange may be omitted, I find it facilitates assembling of the joint.

It is to be understood that changes may be made in the details of construction and arrangement of parts without departing from the spirit and scope of my invention.

What I claim is:

1. In a floating pipe joint comprising inner and outer tile pipe members of the bell and spigot type and defining between them an annular space, means to provide for the deflection of adjacent pipe sections without fracturing the bell, comprising a gasket of cellular rubber-like material mounted in this space and bonded to the spigot and bell.

2. In a floating pipe joint comprising inner and outer tile pipe members of the bell and spigot type and defining between them an annular space, means to provide for the deflection of adjacent pipe sections without fracturing the bell, comprising a gasket of rubber-like material having internal spaces so that the gasket is extensible and compressible in all directions mounted in this space, and of such dimensions that with the pipe sections in alignment the gasket is under compression, the gasket being bonded to the bell and spigot.

CHARLES E. BENNETT.